(12) United States Patent
Heuman

(10) Patent No.: US 12,265,598 B2
(45) Date of Patent: Apr. 1, 2025

(54) METHOD AND SYSTEM FOR REMOTE VOTER IDENTITY VERIFICATION AND LIVENESS DETECTION IN AN ONLINE VOTING SYSTEM

(71) Applicant: Matthew Heuman, Kitchener (CA)

(72) Inventor: Matthew Heuman, Kitchener (CA)

( * ) Notice: Subject to any disclaimer, the term of this patent is extended or adjusted under 35 U.S.C. 154(b) by 336 days.

(21) Appl. No.: 17/763,705

(22) PCT Filed: Sep. 24, 2020

(86) PCT No.: PCT/CA2020/051280
§ 371 (c)(1),
(2) Date: Mar. 25, 2022

(87) PCT Pub. No.: WO2021/056111
PCT Pub. Date: Apr. 1, 2021

(65) Prior Publication Data
US 2022/0405366 A1    Dec. 22, 2022

Related U.S. Application Data

(60) Provisional application No. 62/905,709, filed on Sep. 25, 2019.

(51) Int. Cl.
*G06F 21/32*       (2013.01)
*G06V 40/16*       (2022.01)
(Continued)

(52) U.S. Cl.
CPC ............ *G06F 21/32* (2013.01); *G06V 40/161* (2022.01); *G06V 40/40* (2022.01); *G07C 13/00* (2013.01)

(58) Field of Classification Search
CPC ...... G06F 21/32; G06V 40/161; G06V 40/40; G07C 13/00
See application file for complete search history.

(56) References Cited

U.S. PATENT DOCUMENTS 7,237,717 B1    7/2007    Rao et al.
7,635,088 B2    12/2009   Chung et al.
(Continued)

FOREIGN PATENT DOCUMENTS

CA    2974409 A1    7/2016
CA    2923483 A1    9/2017
(Continued)

OTHER PUBLICATIONS

International Search Report and Written Opinion mailed Dec. 2, 2020, in corresponding International Patent Application No. PCT/CA2020/051280 (10 pages).

*Primary Examiner* — Brian F Shaw
(74) *Attorney, Agent, or Firm* — Smart & Biggar LP

(57) ABSTRACT

A system for remote voter verification, comprising a user device including a camera, the user device configured to generate registration request including a set of biometric information; a voting authority agent device configured to receive an indication of a failed registration attempt; and at least one registration processor, the at least one registration processor communicatively coupled to the remote user device and located remote from the user device, the at least one registration processor communicatively coupled to the voting authority agent device, the at least one registration processor configured to receive the registration request from the user device, evaluate a liveness status from the set of biometric information, generate the indication of a failed registration attempt in response to a negative liveness status, and send the indication of a failed registration attempt to the voting authority agent device for manual verification.

11 Claims, 3 Drawing Sheets

(51) Int. Cl.
  *G06V 40/40* (2022.01)
  *G07C 13/00* (2006.01)

(56) References Cited

U.S. PATENT DOCUMENTS

| | | |
|---|---|---|
| 9,824,520 B2 | 11/2017 | Correa Parker |
| 10,262,126 B2 | 4/2019 | Tussy |
| 11,138,821 B2 | 10/2021 | Heuman |
| 2002/0084325 A1 | 7/2002 | Reardon |
| 2004/0024635 A1 | 2/2004 | McClure et al. |
| 2005/0035199 A1 | 2/2005 | Goci et al. |
| 2005/0161507 A1 | 7/2005 | Openshaw et al. |
| 2010/0153190 A1 | 6/2010 | Matos |
| 2011/0089236 A1 | 4/2011 | Chung et al. |
| 2013/0301873 A1 | 11/2013 | Hoover et al. |
| 2015/0012339 A1 | 1/2015 | Onischuk |
| 2015/0012399 A1 | 1/2015 | Ceribelli et al. |
| 2015/0039403 A1 | 2/2015 | Grossberg et al. |
| 2015/0221153 A1* | 8/2015 | Dashiff ............... G07C 13/00 705/12 |
| 2018/0114391 A1 | 4/2018 | Seibel et al. |
| 2018/0211467 A1 | 7/2018 | Babic et al. |
| 2020/0042685 A1* | 2/2020 | Tussy ............... G06V 40/167 |

FOREIGN PATENT DOCUMENTS

| | | | |
|---|---|---|---|
| WO | 2013080126 A1 | 6/2013 | |
| WO | WO-2016200416 A1 * | 12/2016 | ............ G06F 21/32 |

* cited by examiner

METHOD AND SYSTEM FOR REMOTE VOTER IDENTITY VERIFICATION AND LIVENESS DETECTION IN AN ONLINE VOTING SYSTEM

TECHNICAL FIELD

This disclosure relates to online voting systems and, more particularly, to the confirmation of a user identity using encrypted visual communication channels.

BACKGROUND

An important aspect of an online voting system is the registration of voters prior to usage of the online voting system. Voter identities must be screened to confirm eligibility to vote, such as by an official election administrator or agent thereof.

At present, identification of voters in an online system typically involves the use of a PIN code or access code to verify a voter's identity. The PIN code or access code is delivered via postal or electronic networks to the voter to allow them access to an online voting system. Generally, these codes are sent to a voter after the voter has submitted proof of their identity. However, once the code is sent, any user with the code can access the online voting system portal, even if they are not the intended user of the code.

Yet codes continue to be used, since previous attempts at facilitating remote verification were exposed as being incongruent with the requirements of enhanced security identity verification.

Other prior attempts at facilitating remote verification have included biometric registration which uses pictures of a voters face and submitted ID to corroborate a voter's identity and eligibility to declare a voter device approved for use in an online voting system. These biometric methods also carry a weakness in that they do not confirm a voter's identity at-time-of an online vote being cast. Once a voter has been registered, anyone can potentially use their device to access an online ballot.

SUMMARY

In a first aspect, some embodiments of the invention provide a system for remote voter verification, comprising a user device including a camera, the user device configured to generate a registration request including a set of biometric information; a voting authority agent device configured to receive an indication of a failed registration attempt; and at least one registration processor, the at least one registration processor communicatively coupled to the remote user device and located remote from the user device, the at least one registration processor communicatively coupled to the voting authority agent device, the at least one registration processor configured to receive the registration request from the user device, evaluate a liveness status from the set of biometric information, generate the indication of a failed registration attempt in response to a negative liveness status, and send the indication of a failed registration attempt to the voting authority agent device for manual verification.

In some embodiments, the registration request further includes a set of identifying information, and the at least one registration processor is further configured to compare the set of identifying information to a list of eligible voters to determine an eligibility status, generate the indication of a failed registration attempt in response to a negative eligibility status, and send the indication of a failed registration attempt to the voting authority agent device for manual verification.

In some embodiments, the set of biometric information includes a set of images of a user.

In a second aspect, some embodiments of the invention provide a method of voter registration, comprising receiving a registration request from a user device of a user, the registration request including a set of at least one piece of identifying information; prompting the user to provide a set of at least one image of a face of the user; creating a facemap file from the set of at least one image; sending the facemap file and the set of at least one piece of identifying information to an election authority agent device to be manually reviewed by an agent; receiving an approval indicator from the election authority agent device; and approving the registration request.

In some embodiments the method further comprises creating a registration token containing an indication that the user has been approve, and sending the registration token to the user device to be stored.

The method may further comprise evaluating a liveness status from the set of at least one image and determining that the set of at least one image does not result in a positive liveness determination, and sending the facemap file and the set of at least one piece of identifying information to the election authority agent device in response to determining that the set of at least one image does not result in a positive liveness determination.

BRIEF DESCRIPTION OF THE DRAWINGS

A clear understanding of examples of systems, methods, and apparatus of the present disclosure may be had by reference to the appended drawings. The drawings illustrate examples of the method and system of the present disclosure, and are not to be considered as limiting. Accordingly.

DETAILED DESCRIPTION

Various systems, methods and apparatus will be described below to provide an example of each claimed embodiment. No embodiment described below limits any claimed embodiment and any claimed embodiment may cover systems, methods and/or apparatus that differ from those described below. The claimed embodiments are not limited to systems, methods and apparatus having all of the features of any one system, method and apparatus described below or to features common to multiple or all.

An online voting system is a system which allows a user to cast a ballot over a network (i.e. a computer network), such as the Internet, in an election. Many online voting systems include or work with one or more verification systems. A verification system is a system which allows a user to verify their identity via a responding authentication system to remotely confirm their eligibility to use an online voting system. An example of an online voting system is disclosed in Canadian Patent Application No. 2,923,483, the entirety of which is hereby incorporated by reference herein.

In some embodiments, a verification system may be a hybrid system, which includes automated biometric authentication combined with, or having as a backup, live agent authentication (i.e. a live agent reviewing information from the user and/or interacting with the user).

Figure 1:
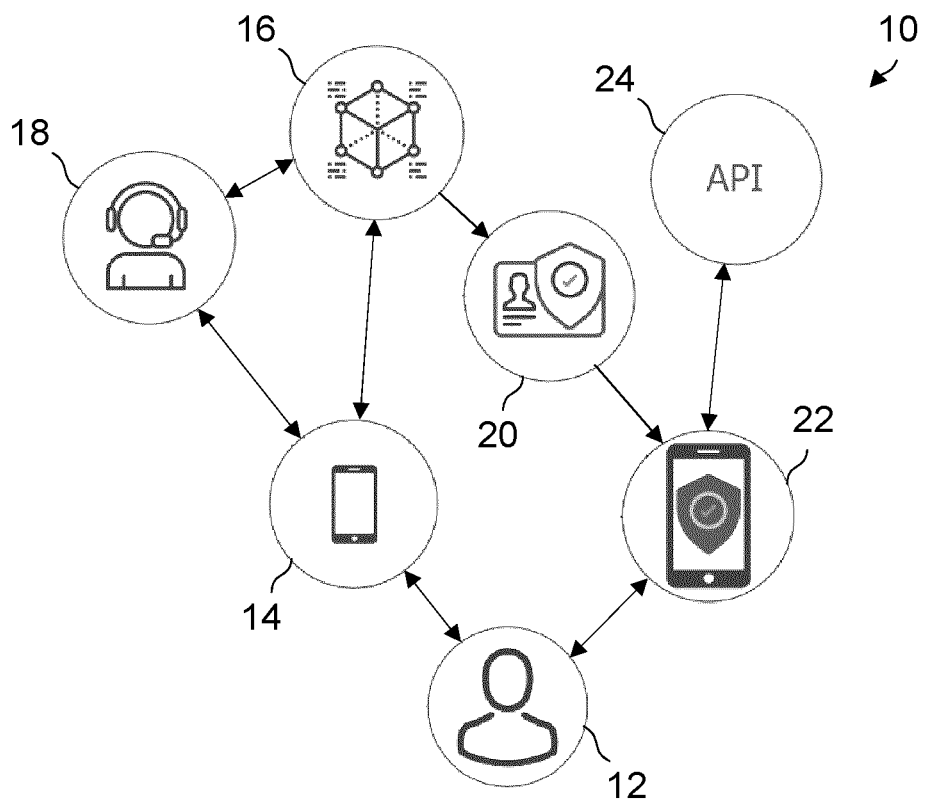
FIG. 1 is a schematic view of a system for remote voter verification, according to an embodiment.

Referring to FIG. 1, an example of a voter identity verification system 10 is schematically depicted. Identity verification system 10 allows a user 12 to use an unregistered user device 14. Unregistered user device 14 is configured to run an interface (e.g. a navigator style interface for walking the user through the verification process and eliciting information from the user) through which the user 12 can provide information and receive directions via screen prompts. User device 14 may be any computer system that also has the capability to be connected with a camera, such as a personal computer or smartphone.

User device 14 is an illustration of the device and interface that may be used to access the service. The system interface can be deployed on a web application or mobile application accessed through user device 14. The system interface connects to a server 16 for initial credential registration. The system interface provided on user device 14 collects data that can be sent to the server 16 that is running the registration system.

Server 16 may be a single server or a plurality of servers. Server 16 is connected to user device 14 through a network (e.g. a computer network) to receive information from user device 14. The information is then used to confirm identity and eligibility. The confirmation process may be automatic, such as an automated process comparing a photo and/or personal information to user records (e.g. a government file photo of the user). The confirmation process may include liveness detection. For example, in some embodiments the information received from the user device 14 includes biometrics, such images and/or video of a user's face.

In a first contact between an unregistered user device 14 and server 16, the user 12 and their user device 14 may need to be registered. The user may be asked to provide information that includes an identification card such as a driver's license, passport, or health card.

The user may then be asked to undergo a liveness detection test or to provide information to be used in verifying further liveness. For example, a user may be asked to provide (e.g. via a camera associated with device 14) information that includes a video or series of images of the user's head or upper body showing the head or upper body from various angles. The images may be analyzed to detect liveness of an individual in a 3D vector facemap. This facemap is sent to the server for encryption and analysis and a copy is stored for usage when the voter attempts to access the online voting system to cast a ballot. A similar set of instructions asking for images is to be given to a user 12 at-time-of-vote so that if the later images match the earlier images then the authentication is considered valid and access is granted, as will be explained further below.

During a picture submission step, a user may be required to move their head or change the camera depth in a way that allows multiple different images to be taken using the device's camera. These images are then analyzed using a 3D face mapping algorithm to analyze and create a 3D map of the user's face. This 3D map may then be encrypted and stored on the server 16 for future detection of the user's liveness and/or identity.

If the registration process happens ahead of the voting process, such as an hour or a few hours or a day or more before the voting process, a registration may mean that only identity and/or liveness verification is required from the registered user and user device later on upon accessing the system to vote. For example, at the time of registration the user may be asked to provide information for use in liveness detection later on at the time of accessing to vote (e.g. when being verified prior to voting), to confirm that at the time of accessing to vote they are in fact the registered or preauthorized user.

During a registration, server 16 may request, for example, one or more of a name, password, identification cards, documents, or geographic codes such as global positioning system information, to be checked (e.g. to verify that the user is eligible to be registered and/or to vote). In some embodiments, a user may be prompted to provide the information via the camera connected to the user device 14, such as to hold an identification card in front of the camera, to allow the server 16 to analyze and check the authenticity of the provided document. After the initial authentication check, the system can allow the user to take one or more images of the user's face at the moment of authentication, and send the one or more images to the server for analysis and storage.

The server 16 may then aggregate information provided by the user and check it against a number of criteria to verify if the ID, data, picture or otherwise is correct or eligible for review by a live agent.

Data points, including the 3D face map, are sent to the server 16 which will then facilitate the connection to an agent 18 for remote verification of eligibility. Agent 18 is an agent of an electoral administrative body. Agent 18 determines whether a user 12 who has gone through the registration process should be registered to vote, or if they should be blocked or further reviewed. In some examples, a human agent 18 reviews every voter 12 during the registration process regardless of whether they pass automated eligibility and/or automated liveness detection processes of the system 10 (e.g. unlike during the voter verification process prior to allowing the voter to cast a ballot), and makes a final determination regarding whether to register the user. In some examples, the human agent 18 only reviews a voter 12 during the registration process if they fail automated eligibility and/or automated liveness detection processes of the system 10. As will be discussed further below, the agent 18 may also be made available later on when a user accesses the system to vote, so that the agent 18 can be put in touch with users (e.g. registered users) who fail a liveness detection step to allow the agent 18 to manually determine liveness and grant or deny access for ballot casting.

An agent 18 is a human person who views the results of the data entry and algorithmic check and then proceeds to either grant further access to verification or expunges the user from the process. In some embodiments, agent 18 may also interact with the user via a camera or server 16 to provide further instructions or information gathering processes to facilitate verification or provide service depending on criteria of services needed, such as if the user 12 encounters an error or other issued during the registration process.

The agent 18 will review the provided information from the live camera feed and other input, and validate based on the authenticity of all aggregated information and make a final determination on registration.

Once satisfied, the agent 18 can notify server 16 that user 12 is to be registered. User 12 may then receive a hash function 20. Hash function 20 is stored on user device 14 in a cryptographic value onto a user's device by pulling information such as, but not limited to, a user device unique identifier number (IMEI/MEID) combined with time, locality and user identity. An anonymous hash value token may be created to allow for persistent verification and use on an online voting system. User device 14 having a stored hash function 20 is then a registered user device 22.

Hashed value 20 is computed and sent to the unregistered user device 14 to generate a registered user device 22 and is also stored on the server 16. The cryptographic hash value 20 that is produced after the agent 18 confirms the identity and eligibility of the user 12 is a combination of associative information and data such as, but not limited to, time, locality and region. The hash value is stored on the device 22 and allows the user 12 to use the online voting system like a key while anonymizing the user's identity from the central server or servers of the online voting system or from other observance.

Registered user device 22 can be used to access an online voting system. The token 20 on device 22 may be stored persistently until it is revoked at a later time. For example, an election authority or agent 18 may decide after the election to revoke the token, or may revoke the token due to information or evidence indicating an issue with eligibility of the user 12 or device 22 for participation in the online voting system.

The registered user device 22 can be used to sign into an access portal of an online voting system via a web or application interface and be validated that they are an eligible voter and are to be permitted to access the online voting system. For example, an application program interface (API) 24 may be accessed by registered user device 22 to access the online voting system. In some embodiments the API 24 may be run on server 16, while in some embodiments the API 24 may be run on one or more separate servers.

This API 24 is the initial interface portal to the online voting system. This API 24 can be accessed at any time as long as the stored token 20 on the phone 22 is still valid. When accessing API 24, a user 12 may again have liveness detected. For example, the user 12 may be instructed to again provide images or video, which can then be compared to images or video acquired during registration and/or other access attempts. The new images or video can be compared to the old and also used to detect liveness. If the user 12 passes this second authorization and the new 3D face map matches the previously submitted one, the user 12 will be granted access to the online voting system. Comparatively, if user 12 fails to be authenticated as the registered user or fails to be authenticated as alive or the 3D face map fails to detect accurately, the user 12 can be connected to an election official, such as agent 18 or another official, to verify user's 12 identity using secure video communication channels.

In some embodiments, at the conclusion of the ballot casting process the hash value 20 can be terminated via a signal sent from the host voting system server 16 to the registered user device 22 to confirm that the process has been completed and the session terminated.

Tokens 20 can also be invalidated from the server 16 remotely for additional security for any reason, such as a determination following an audit that user 12 is not eligible to vote or was incorrectly registered.

Providing access to a live agent 18 alleviates inequity caused by a fully automated algorithm to detect liveness in an online voting system, since anyone failing the automated system threshold will still have a chance at the same equitable use of the online voting. The presence of the agent 18 may be important for the initial registration of a user 12 and unregistered user device 14 to make final registration decisions and/or handle any issues with the automated system, and for the later access of a user 12 and registered user device 22 for the casting of a ballot to handle any issues with the automated system. Combining liveness algorithms with human oversight provides a redundancy step that facilitates equitable usage of an online voting system despite technological shortfalls.

In-person oversight working in conjunction with algorithmic analysis to verify voters' identities is necessary to ensure the integrity of established protocols and procedures are adhered to but also provide paramount security when facilitating access to an online voting system where identity must be verified to maintain election integrity.

It should now be appreciated that in some embodiments, the present disclosure provides a hybrid model remote identity algorithmic verification system with an authenticated encrypted token registration system between an interface device and a receiver over a data network comprising secure methods that safeguard against traffic analysis and eavesdropping by unauthorized parties and ensure secure identification is verified and confirmed.

This hybrid method of verification and liveness detection uses both digital and analog identity verification procedures to ensure high accuracy and authenticity of a voter's identity while maintaining anonymity and creating a multi-factor authentication mechanism to verify voter identities remotely.

Figure 2A:
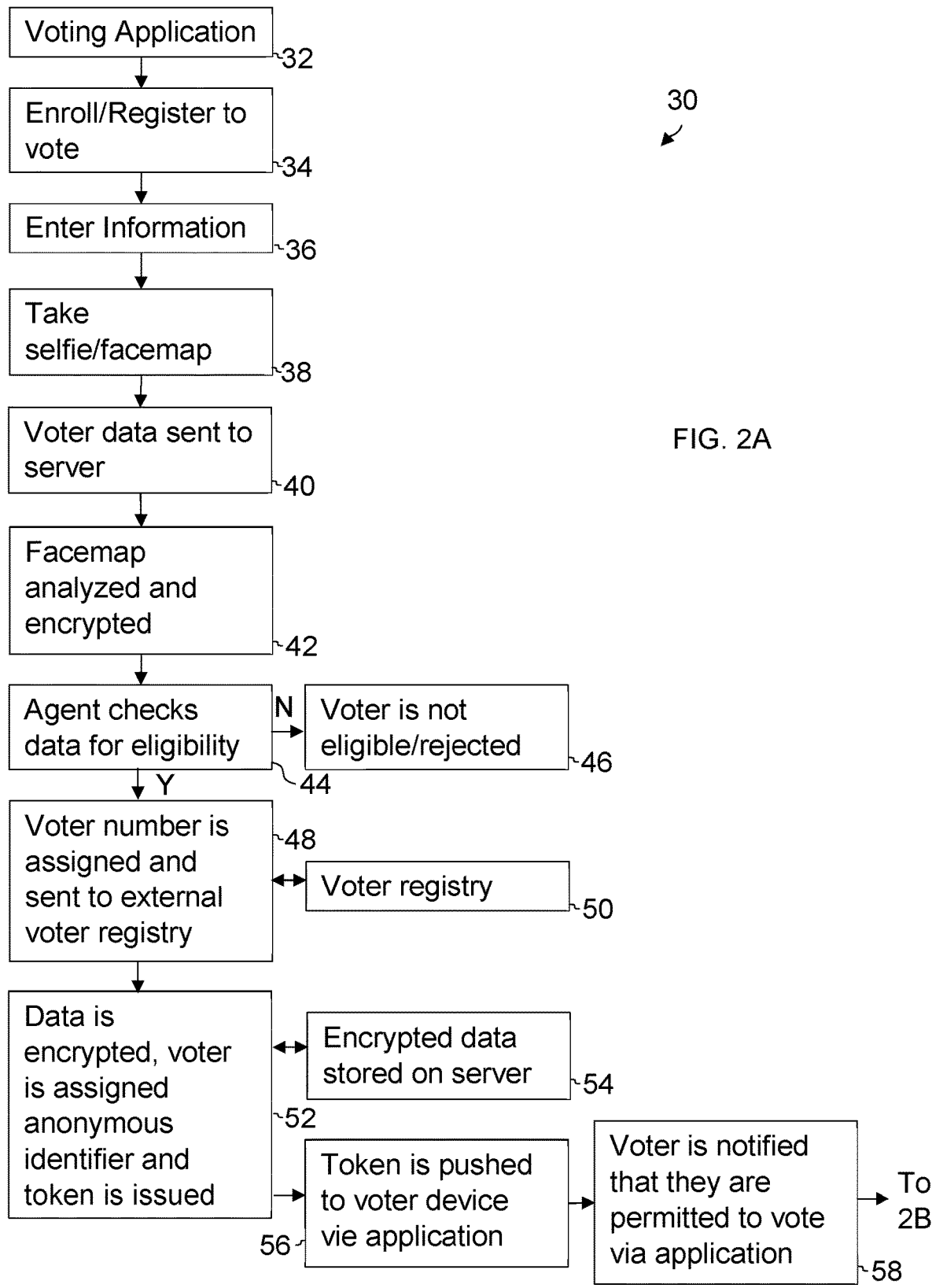
FIG. 2A-2B is a flow chart of a registration and voting method, according to an embodiment.
Figure 2B:
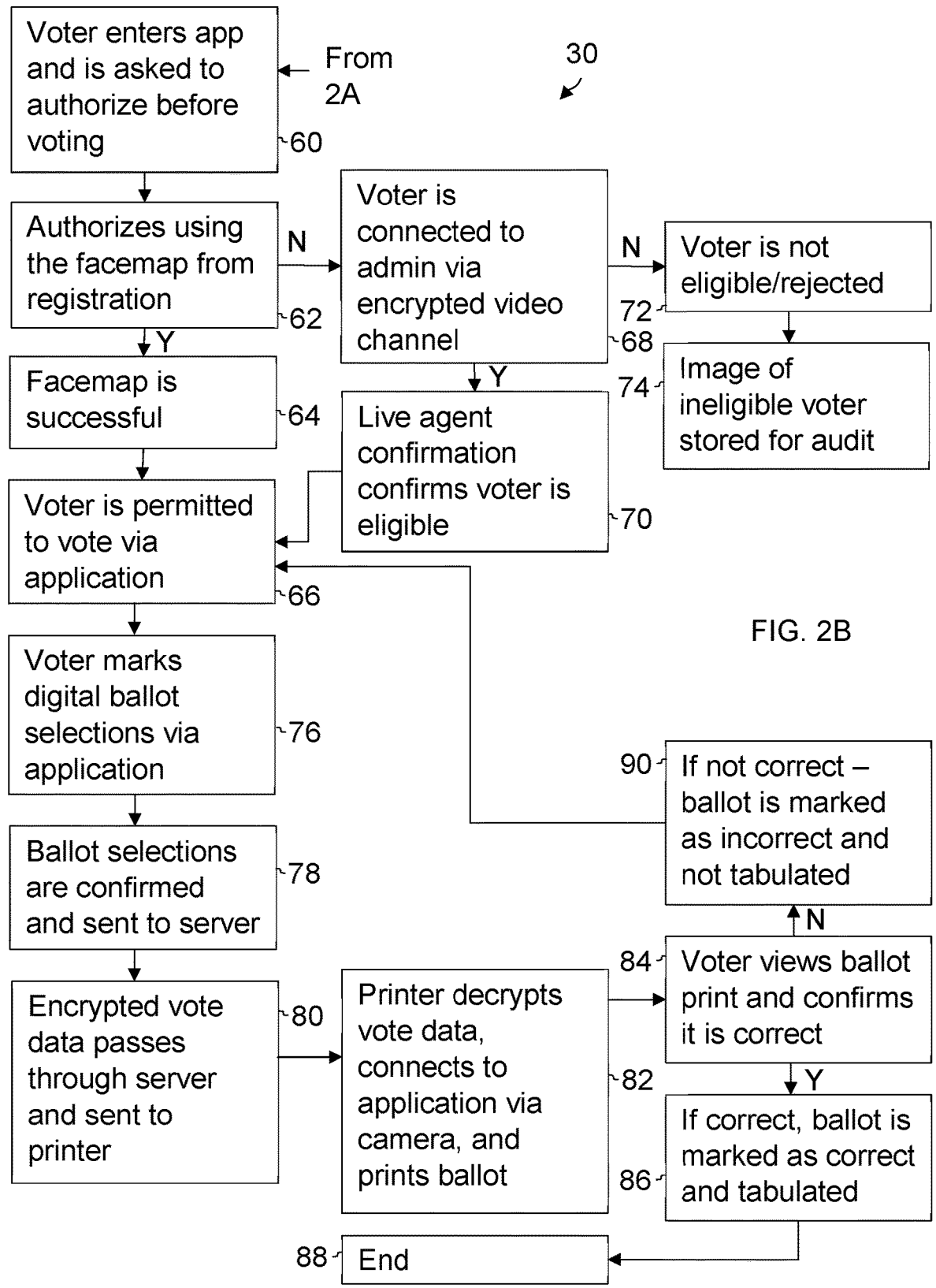

Referring to FIGS. 2A-2B, an embodiment method 30 of registration and voting is depicted.

FIG. 2A depicts a first step 32 in which a system is accessed by a user through a user device. At step 34 the system receives a request to enroll or register the user, and permits the user to enroll or register themselves to use the application in an election. The system presents the user with prompts to provide information at step 36, for example the user may be given a field to enter information including a name or unique identifier (pin code, postal code, etc.) In some embodiments, a user is prompted to take a photo of their identification.

At step 38 the system prompts a user to provide at least one image of the user's face, such as to be used to create a 3D facemap file to be used for future authorization. At step 40 the user data is sent to a server of the system. The image information is encrypted and stored on the server at step 42.

At step 44 a human agent or administrator reviews the data and determines if the user is an eligible voter. If the agent determines that the user is not edible, at step 46 the user is rejected, for example they may be told they need to see an election administrator in person. If the agent determines that the user is eligible, at step 48 a voter number or other identifier is assigned. At step 50 the voter number or other identifier is sent to an external voter registry to be recorded.

At step 52 user data and the voter number or other identifier is encrypted to create a universal unique identification number (UUID) and hashed into a token. At step 54 the token is stored on the server. At step 56 the token is also sent to the user device. Optionally, the voter is then notified that they are permitted to vote using the application on the user device at step 58.

At step 60 the voter may user the user device to access the system through the application, and the token is checked against the version on the server. If the token matches, the voter is asked at step 62 for at least one image to be matched against the at least one image the system has. At step 64 the system recognizes the voter and/or determines that the voter has passes a liveness status check (i.e. a positive liveness determination) and at step 66 the system grants the voter access to vote by way of the application.

If the voter is not recognized, such as if the voter provides a set of images three times and each time the set of images does not match a stored facemap and/or fails the liveness status check (i.e. a negative liveness determination), the system connects the voter to a human agent at step 68 by way of an end-to-end encrypted video channel. If the live agent indicates that the voter's identity is verified at step 70, the system grants the voter access to vote at step 66 just as if the system had recognized the voter.

If the live agent indicates at step 72 that the voter is not eligible, at step 74 the system optionally stores at least one image of the user for later auditing purposes.

At step 76, the system receives an indication of a vote from the voter. For example, the system may provide a digital ballot on an interface allowing a user to select one of a number of choices. At step 78 the voter is optionally asked to confirm their choice and the choice is sent to the server.

The vote may be tabulated electronically or by way of a printed ballot. For example, at step 80 the choice is optionally sent by the server to a printer. At step 82, optionally, the printer system decrypts the choice information, prints a ballot with the user choice marked on the ballot, and connects to the user device to provide at least one image of the ballot to the user device. The user may be provided with a further opportunity to confirm their vote. At step 84 the user is optionally provided with the image of the ballot and asked to confirm that the ballot is correctly marked. In some embodiments, the ballot may be printed with the voter's UUID, such as marked in a way that allows the voter to see it but not a person counting the printed ballot. For example, infrared ink may be used and for the UUID the ballot illuminated so that the user can see the UUID.

If the user indicates that it is correctly marked, at step 86 the ballot is designated verified for counting, and the system then ends the voting method at step 88. If the user indicates that the ballot is not correctly marked, at step 90 the ballot is designated incorrect and may be discarded. In some embodiments, if the ballot is designated incorrect, the voter is again permitted to vote such as at step 66.

It is to be understood that in other embodiments one or more of the steps of method 30 may be omitted.

In some embodiments, this disclosure relates to online voting systems having one or more of the following features:

A hybrid model remote identity algorithmic verification system with authenticated encrypted token system to allow users to have their identity checked remotely using an algorithm and human backed verifier to create a valid registration database and access portal to an online voting system using a token certificate.

Means for designing and producing an interface on a computer, mobile phone, tablet or other system to verify using human backed agents via the camera attached to said system.

Means to have an algorithm match a camera picture against other images to create a 3D face map file that is stored and used to corroborate against other 3D facemap files to determine accuracy and eligibility of a voter in an online voting system.

Means for the system to connect to a human election agent for initial registration and in an end to end encrypted visual communication channel if the liveness detection drops below the security threshold.

Means for the agent to validate the identity and give the algorithm a confirmation or fail grade.

Means of storing the result and identity confirmation and anonymizing the identity and storing the data in a database.

Means of communicating said database comprised of eligible identities in an encrypted token certificate.

Means of creating a secure token with each initial authentication and subsequent entry for further review and external services.

Means to load said interface application onto a server or database for deployment.

Means for loading TOKEN system onto a phone for local storage or database to be stored and read by other services.

Means for generating a secure session environment for algorithm identification and agent verification.

Means for TOKEN system to be read but not rewritten.

Means for generating a session identifier per each authentication and computing a hash value token using cryptographic computation.

Means for anonymizing data if identity needs to by anonymous for usage in an online voting system.

Means for authenticating TOKEN identity by the server and application program interface or revoking tokens remotely using a server.

Means for securing data connection between interface input controls and algorithm, server, agent and corresponding TOKEN database.

Means for interface to respond to agent control such as directions for users to follow to ensure connection is secure against such as but not restricted to man-in the-middle attacks.

Means for user to confirm their identity was correct via the agent on the user interface.

Means for data to be stored and read by external services via API.

Means for confirmation of successful verification in online voting system, server or agent confirmation application.

While the above description provides examples of one or more apparatus, methods, or systems, it will be appreciated that other apparatus, methods, or systems may be within the scope of the claims as interpreted by one of skill in the art.

The invention claimed is:

1. A system for remote voter verification, comprising:
a user device including a camera, the user device configured to generate a verification request including a set of biometric information, the user device being a pre-registered user device having stored thereon a verification token;
a voting authority agent device configured to receive an indication of a failed verification attempt; and
at least one verification processor, the at least one verification processor communicatively coupled to the remote user device and located remote from the user device, the at least one verification processor communicatively coupled to the voting authority agent device, the at least one verification processor configured to:
receive the verification request from the user device,
confirming that the verification token matches a copy stored in a verification database and the user device is therefore the pre-registered device,
evaluate, following the confirmation, a liveness status from the set of biometric information,
generate the indication of a failed verification attempt in response to a negative liveness status, and
automatically send the indication of a failed registration attempt to the voting authority agent device for manual verification.

2. The system of claim 1, wherein the registration request further includes a set of identifying information, and the at least one registration processor is further configured to:

compare the set of identifying information to a list of eligible voters to determine an eligibility status, generate the indication of a failed registration attempt in response to a negative eligibility status, and automatically send the indication of a failed registration attempt to the voting authority agent device for manual verification.

3. The system of claim 1, wherein the set of biometric information includes a set of images of a user.

4. A method of voter registration, comprising:
a) receiving a registration request from a user device of a user, the registration request including a set of at least one piece of identifying information;
b) prompting the user to provide a set of at least one image of a face of the user;
c) receiving the set of at least one image of the face of the user;
d) creating a facemap file from the set of at least one image;
e) automatically, in response to receiving the registration request and the set of at least one image, sending the facemap file and the set of at least one piece of identifying information to an election authority agent device to be manually reviewed by an agent;
f) receiving an approval indicator from the election authority agent device; and
g) approving the registration request.

5. The method of claim 4, further comprising creating a registration token containing an indication that the user has been approved, and sending the registration token to the user device to be stored.

6. The method of claim 4, further comprising:
evaluating a liveness status from the set of at least one image and determining that the set of at least one image does not result in a positive liveness determination, and
automatically sending the facemap file and the set of at least one piece of identifying information to the election authority agent device with an indication that the set of at least one image does not result in a positive liveness determination.

7. The method of claim 4, further comprising, prior to step d), automatically evaluating a liveness status from the set of at least one image and determining whether the set of at least one image results in a positive liveness determination, and wherein step d) proceeds regardless of whether the set of at least one image results in a positive liveness determination and includes sending an indication of whether the set of at least one image results in a positive liveness determination.

8. A voting method, comprising:
a) connecting with a user device of a user in a first connection session;
b) receiving, during the first session, a registration request from a user device of a user, the registration request including a set of at least one piece of identifying information;
c) prompting, during the first session, the user to provide a first set of at least one image of a face of the user;
d) receiving, during the first session, the first set of at least one image of the face of the user;
e) determining that the user is eligible based, at least in part, on the first set of at least one image;
f) creating, in response to determining that the user is eligible, a token;
g) storing a voting authority copy of the token and providing a user device copy of the token to the user device;
h) connecting with the user device in a second connection session subsequent to a termination of the first connection session;
i) receiving, during the second connection session, an access request from the user device, including the user device copy of the token;
j) comparing, during the second connection session, the user device copy of the token to the voting authority copy of the token and determining that the user device copy of the token matches the voting authority copy of the token;
k) prompting, during the second connection session, the user to provide a second set of at least one image of the face of the user;
l) comparing, during the second connection session, the second set of at least one image to the first set of at least one image and determining that the second set of at least one image matches the first set of at least one image; and
m) during the second session, approving the access request and granting access to the user device to provide a vote.

9. The method of claim 8, wherein determining that the user is eligible includes:
a) automatically, in response to receiving the registration request and the first set of at least one image, sending a manual review request based on the first set of at least one image and the set of at least one piece of identifying information to an election authority human agent device to be manually reviewed by a human agent; and
b) receiving an approval indicator from the election authority agent device.

10. The method of claim 9, wherein the second session proceeds without any manual review by a human agent.

11. The method of claim 8, wherein the token is created by hashing a universal unique identification number, the universal unique identification number created by encrypting user data and a voter identifier for the user recorded in a voter registry.

* * * * *